No. 797,934. PATENTED AUG. 22, 1905.
W. S. BIDLE & J. A. COSTELLO.
RIVET MAKING MACHINE.
APPLICATION FILED MAY 18, 1904.

10 SHEETS—SHEET 1.

WITNESSES:
Daniel E. Daly
G. M. Hayes.

INVENTORS
William S. Bidle
Joseph A. Costello
BY
Lynch & Dyer
their ATTORNEYS

No. 797,934.     PATENTED AUG. 22, 1905.
W. S. BIDLE & J. A. COSTELLO.
RIVET MAKING MACHINE.
APPLICATION FILED MAY 18, 1904.

10 SHEETS—SHEET 3.

WITNESSES:
Daniel E. Daly.
G. M. Hayes.

INVENTORS
William S. Bidle
Joseph A. Costello
BY
their ATTORNEYS

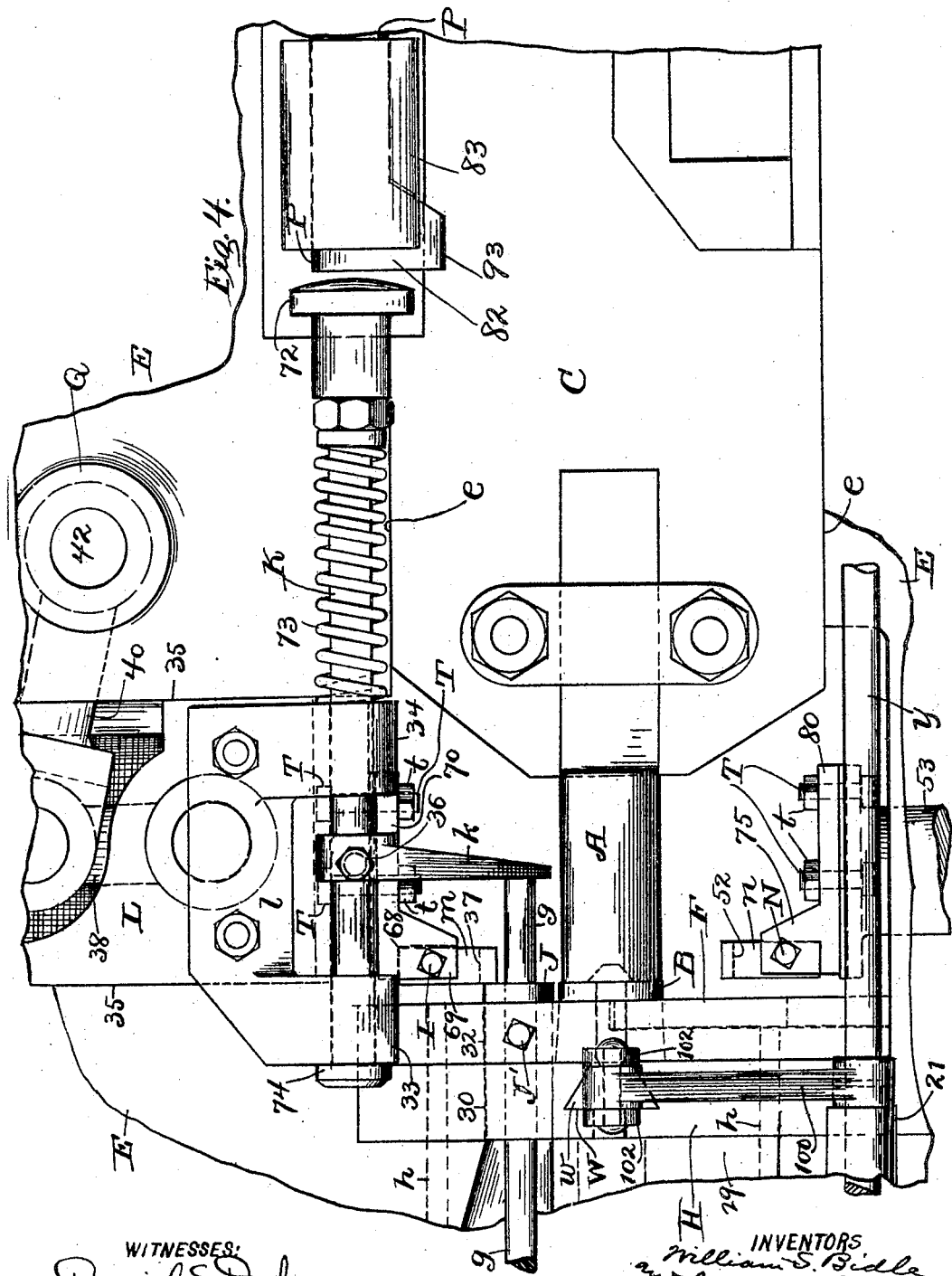

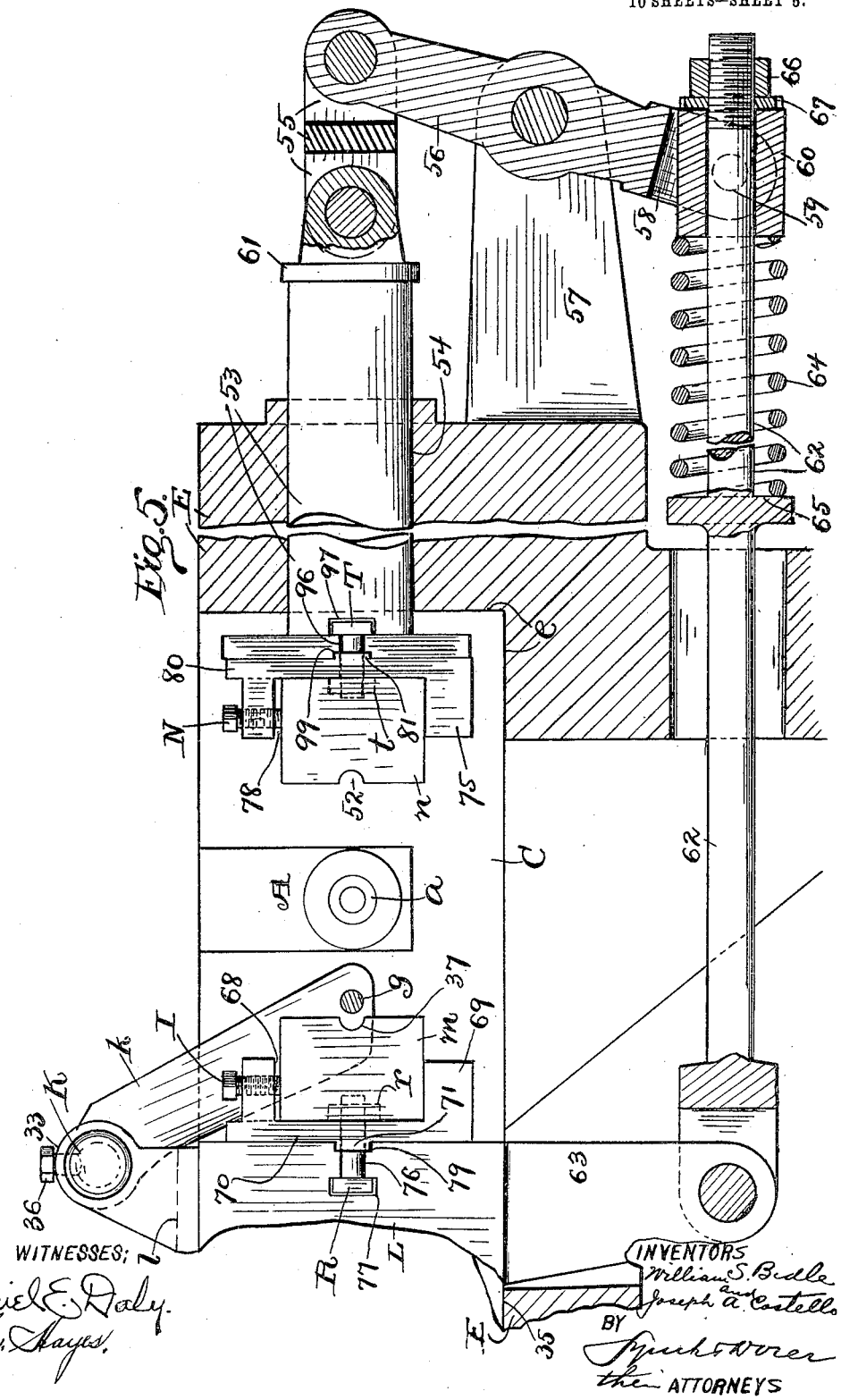

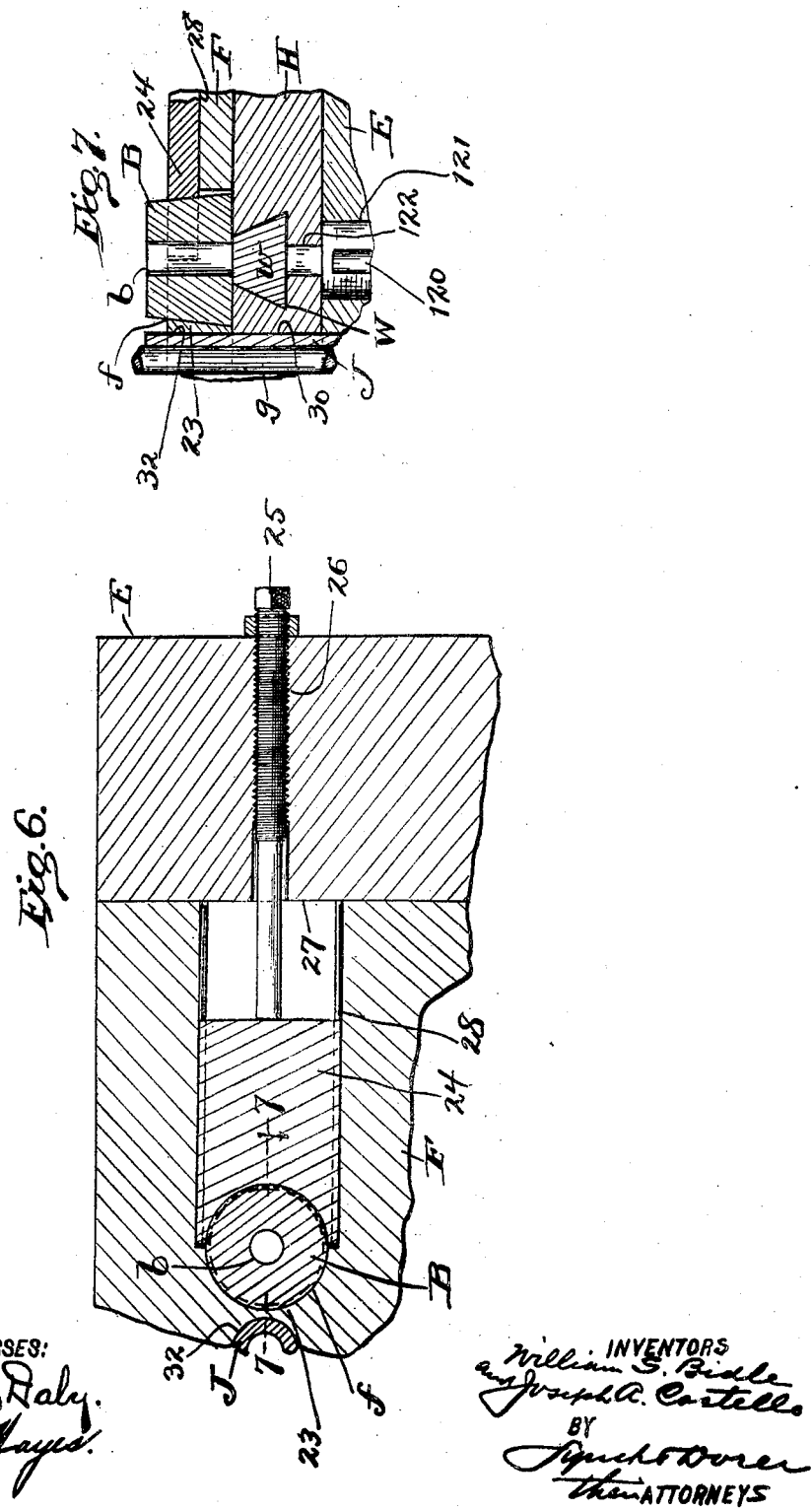

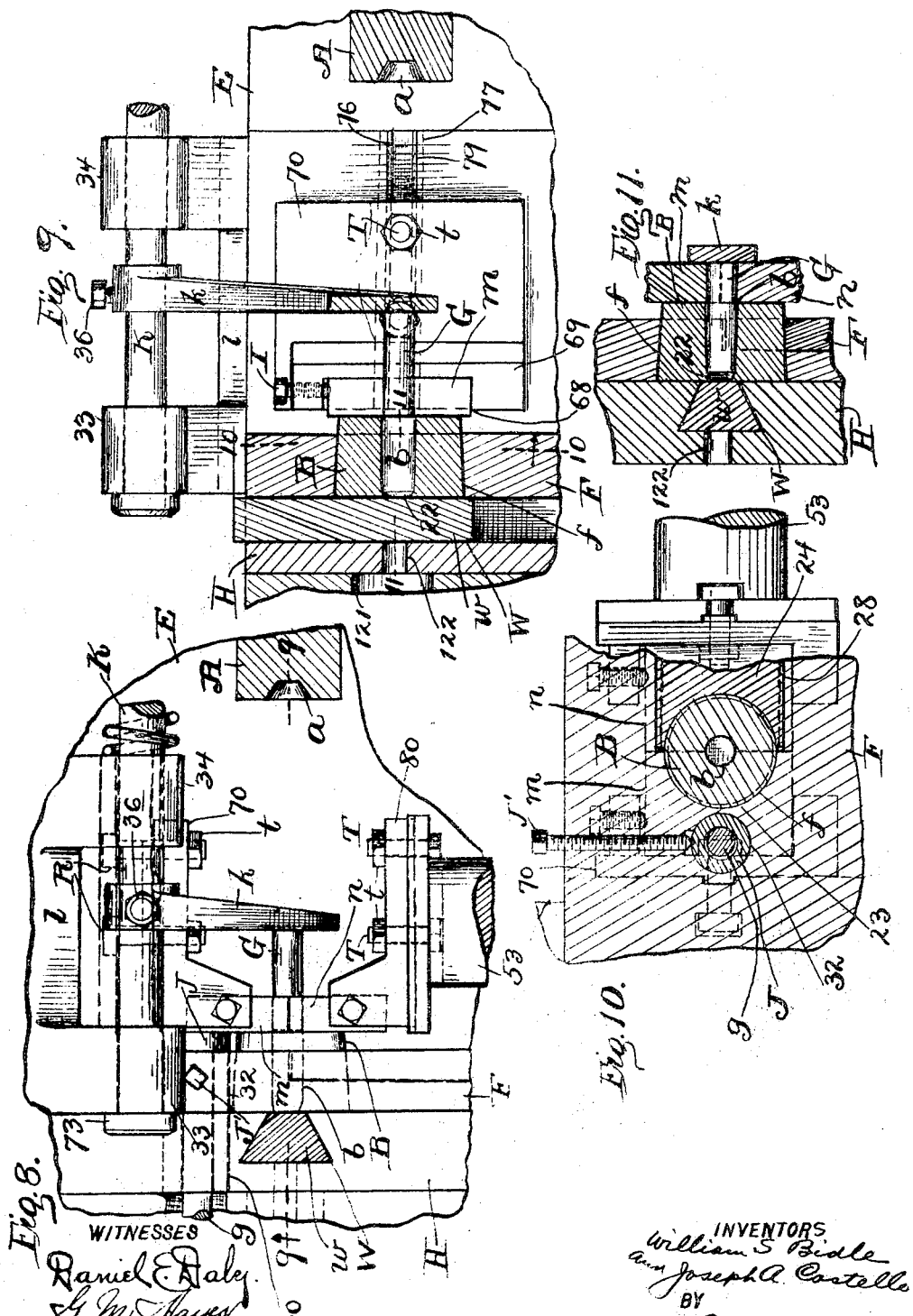

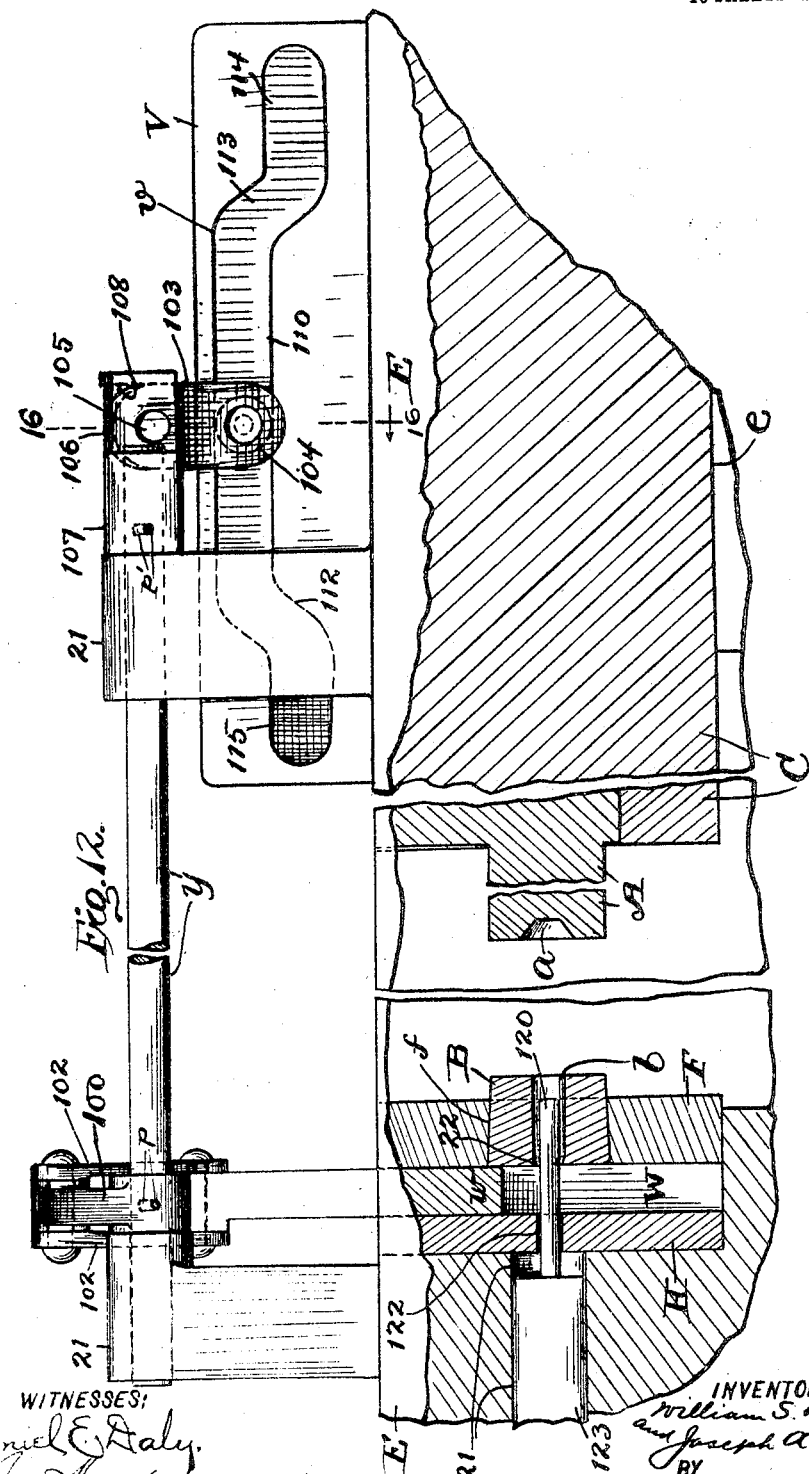

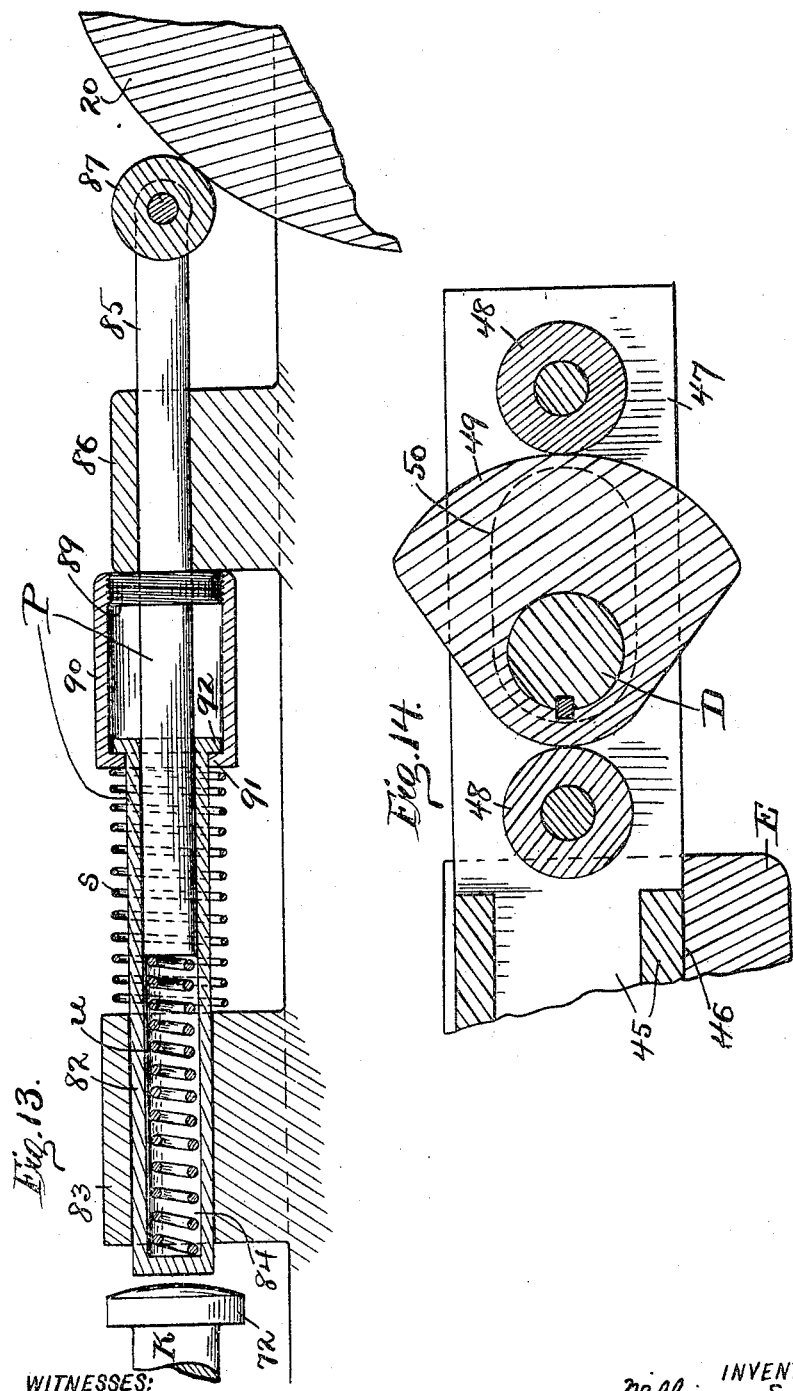

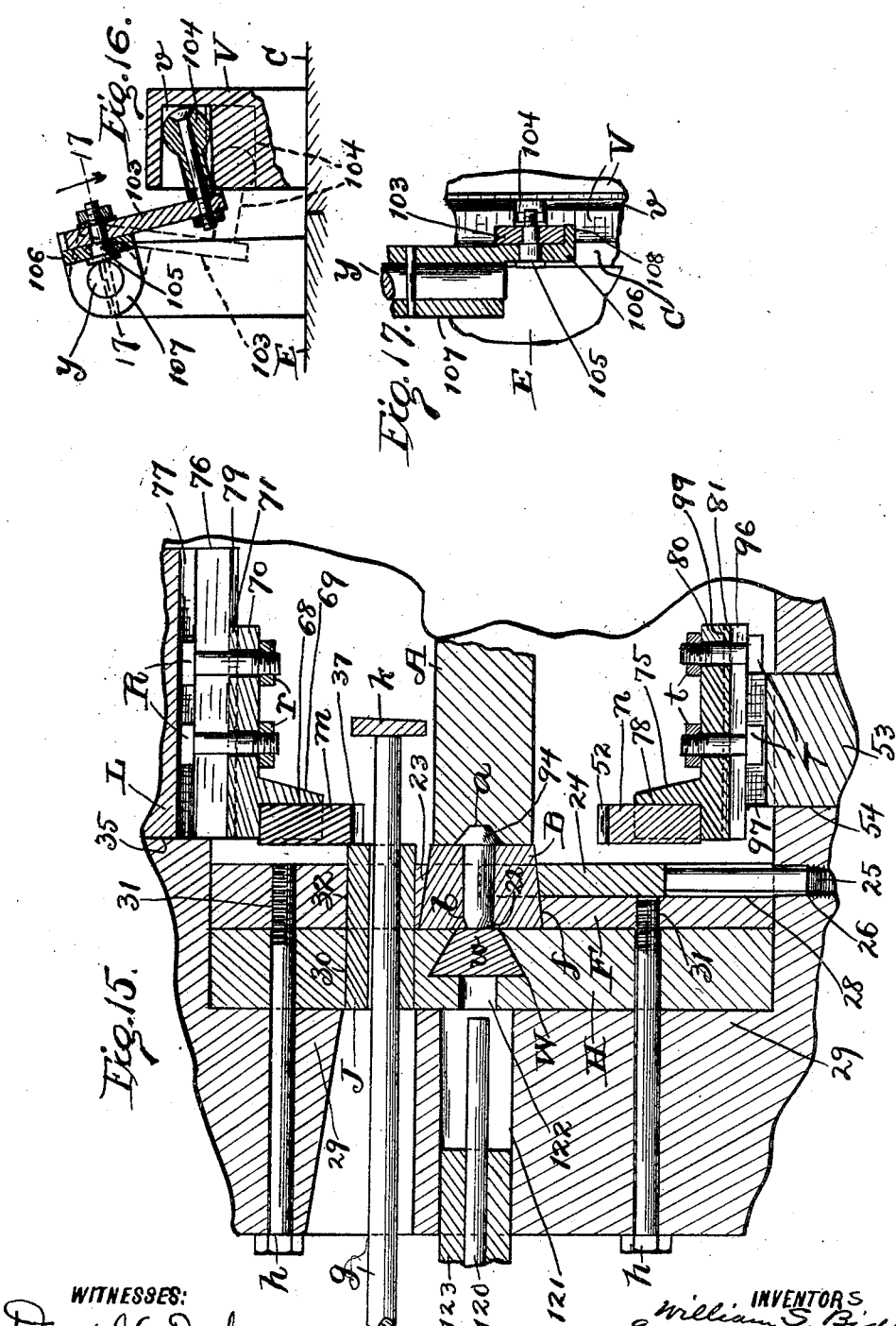

UNITED STATES PATENT OFFICE.

WILLIAM S. BIDLE AND JOSEPH A. COSTELLO, OF CLEVELAND, OHIO.

RIVET-MAKING MACHINE.

No. 797,934.     Specification of Letters Patent.     Patented Aug. 22, 1905.

Application filed May 18, 1904. Serial No. 208,499.

*To all whom it may concern:*

Be it known that we, WILLIAM S. BIDLE and JOSEPH A. COSTELLO, citizens of the United States of America, residing at Cleveland, in the county of Cuyahoga and State of Ohio, have invented certain new and useful Improvements in Rivet-Making Machines; and we do hereby declare the following to be a full, clear, and exact description of the invention, such as will enable others skilled in the art to which it pertains to make and use the same.

This invention relates to improvements in rivet-making machines.

This invention consists more especially in a rivet-making machine which comprises the following: a pair of coöperating heading-dies, the one stationary and the other movable toward and from the stationary die, with the stationary die provided with a blank-receiving bore arranged in line with the blank-engaging cavity in the face of the movable die; means whereby a blank which is to be headed is cut from the rod or stock, fed to the machine at one side of the heading-dies, and moved laterally in advance of the movable die and into line with the blank-receiving bore of the stationary die and centered relative to the said bore; means whereby the blank thus centered relative to the blank-receiving bore in the stationary die is actuated endwise into the said bore; means whereby the movable die is operated, and means whereby the rivet is ejected from the said bore preparatory to the feeding of the next succeeding blank to the said bore.

The primary object of this invention is to build a rivet-making machine which is simple and durable in construction and reliable in its operation, which operates with great facility, does accurate work, and is not liable to get out of order.

With these objects in view and to the end of realizing other advantages hereinafter appearing this invention consists in certain features of construction and combinations of parts hereinafter described, and pointed out in the claims.

Figure 1:
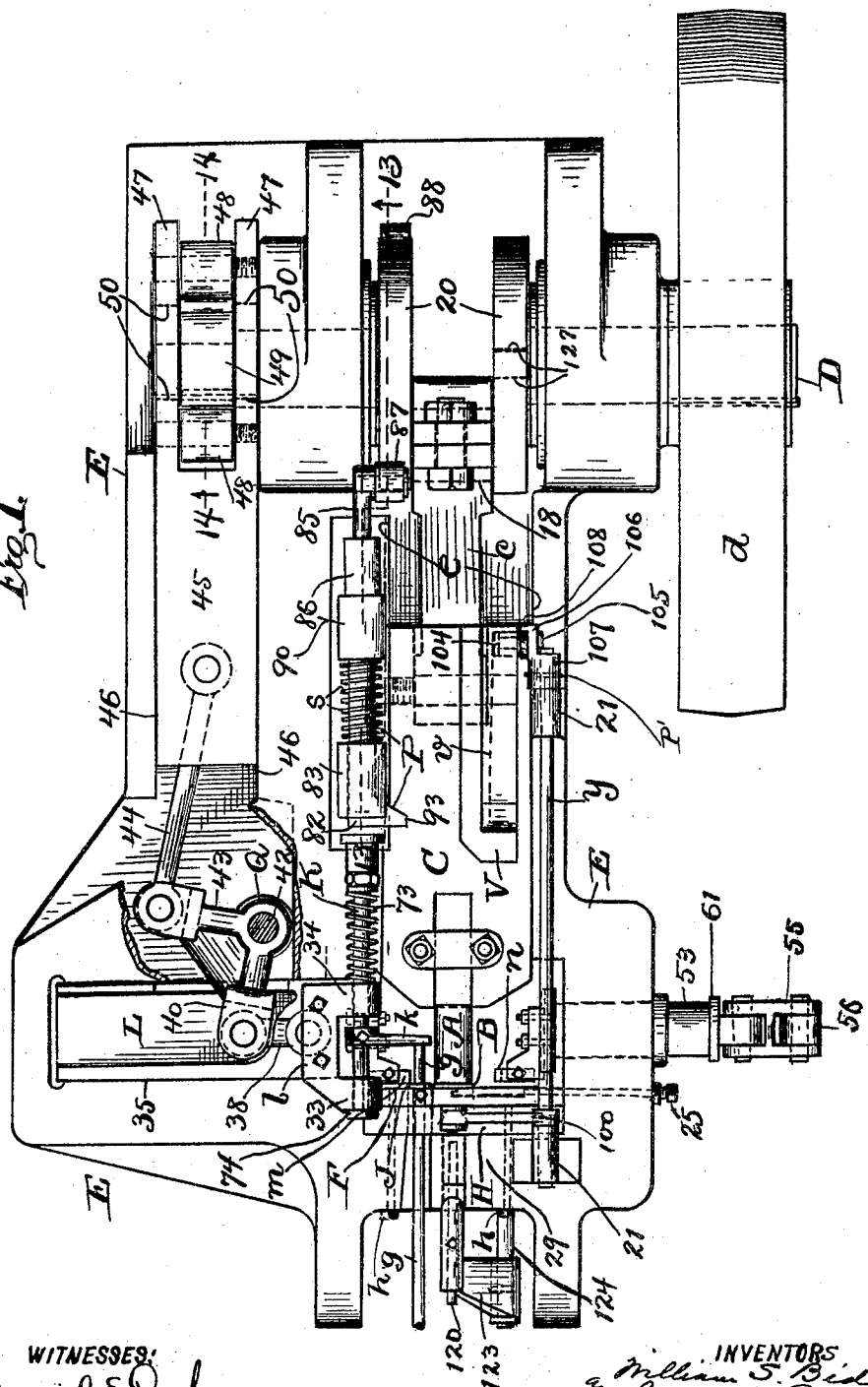
Figure 2:
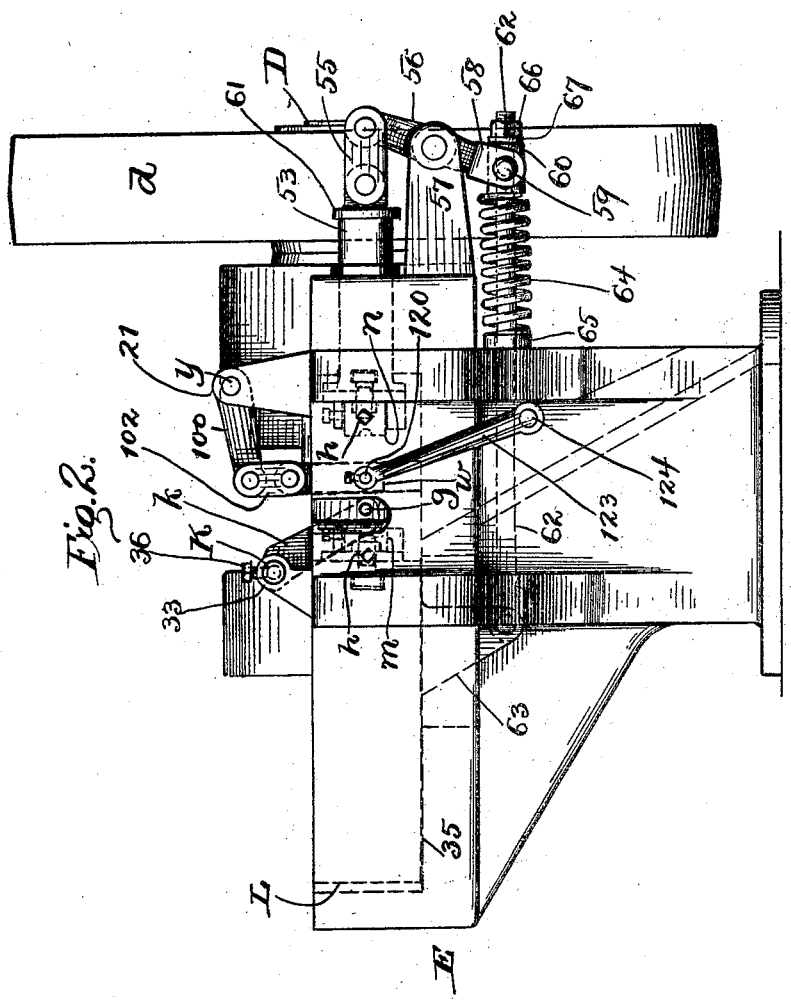
Figure 3:
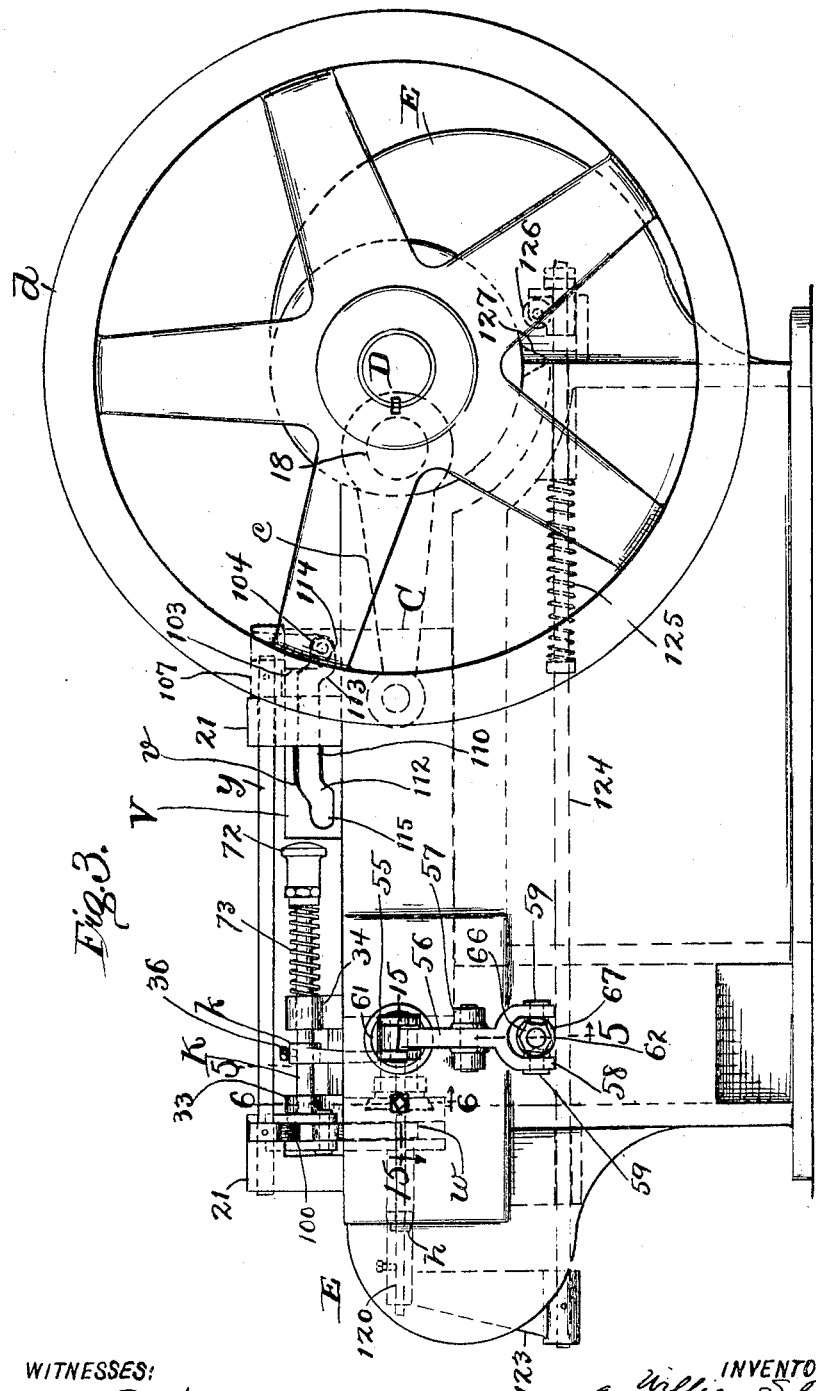

In the accompanying drawings, Figure 1 is a top plan, partly in section, of a machine embodying our invention. Fig. 2 is a front side elevation of the machine. Fig. 3 is a right-hand side elevation relative to Fig. 2. Fig. 4 is a top plan of a portion of the machine. Fig. 5 is a front side elevation of a portion of the machine, partly in section, on line 5 5, Fig. 3. Portions are broken away in Fig. 5 to reduce the size of the drawing. Fig. 6 is a front side elevation of a portion of the machine on line 6 6, Fig. 3. Fig. 7 is a top plan in section on line 7 7, Fig. 6. Fig. 8 is a top plan, partly in section, of a portion of the machine and illustrates the blank brought into position to be fed into the stationary die. Fig. 9 is a vertical section on line 9 9, Fig. 8, looking in the direction indicated by the arrow. Fig. 10 is a vertical section on line 10 10, Fig. 9, looking in the direction indicated by the arrow. Fig. 11 is a top plan in section on line 11 11, Fig. 9, except that in Fig. 11 the blank is shown inserted into the stationary heading-die. Fig. 12 is a side elevation, partly in section, of a portion of the machine and is illustrative of the means employed for actuating the stop, which prevents the blank during the introduction of the blank into the blank-receiving bore of the stationary heading-die from passing out at the outer end of the said bore. In Fig. 12 is shown the manner of ejecting a rivet from the stationary die. Portions are broken away in Fig. 12 to reduce the size of the drawing. Fig. 13 is a side elevation of a portion of the machine in section on line 13 13, Fig. 1, looking in the direction indicated by the arrow. Fig. 14 is a section in detail on line 14 14, Fig. 1, looking in the direction indicated by the arrow. Fig. 15 is a top plan of a portion of the machine in section on line 15 15, Fig. 3. Fig. 16 is a vertical section in detail on line 16 16, Fig. 12, looking in the direction indicated by the arrow. Fig. 17 is a section on line 17 17, Fig. 16, looking in the direction indicated by the arrow. Figs. 4 to 17, inclusive, are drawn on a larger scale than Figs. 1, 2, and 3.

Referring to the drawings, A and B designate a pair of coöperating heading-dies employed to form a head upon the blank which is to be operated upon to form a rivet. The die A is arranged horizontally and secured removably in any approved manner to a correspondingly-arranged slide C, which is operatively connected by means of a pitman *c* (see Fig. 1) with the wrist 18 of the crank 20 of the crank-shaft D, which is operatively provided with a driving-wheel *d*, to which power is suitably applied. The slide C and the die A, carried thereby, are arranged, therefore, at a right angle to the shaft D, and the said slide engages a correspondingly-arranged slideway *e*, formed in the bed or stationary frame E of the machine. It will be observed, therefore, that the die A is reciprocated in a horizontal plane and at a right angle to the shaft D during the operation of the shaft. The die B is stationary and arranged horizontally and forward of and in line endwise with the die A, being formed, preferably, as shown in Figs. 4, 6, 7, 9, 10, 11, and 15, by an annular piece of steel snugly engaging a bore $f$, formed in a plate F, which is arranged vertically on edge and forward and at a right angle to the path of the die A. The die A is provided in its forward end or face and centrally with a cavity $a$, having the dimensions required to engage the head-receiving end of the blank and form the desired head upon the said end during the operation of the heading-dies. The die B is arranged, therefore, with its face opposite to the face of the die A. The stationary die B is provided centrally with a bore $b$, which extends endwise through the said die and is slightly and gradually reduced transversely and annularly at its outer end, as shown in Figs. 9, 11, and 15, and the surrounding wall of the said reduced end of the said bore is beveled, so as to form a beveled shoulder 22, which faces the inner and blank-receiving end of the bore.

In Figs. 8, 9, 10, and 11 is shown a blank G to be headed. The blank is fed to the stationary die B and introduced into the bore $b$ of the said die, as will hereinafter appear. The blank upon being introduced into the bore $b$ is prevented from moving to the outer extremity of the said die by the shoulder 22. The blank introduced into the bore $b$ is of course long enough to project the desired distance beyond the face of the die B in the direction of the die A.

The stationary die B is removably secured in place, and a longer or shorter die B is employed, according as a shorter or longer rivet is to be made. The die B is shown gradually enlarged transversely toward its outer end, and the engaging bore $f$ in the plate F is correspondingly enlarged toward the said end.

The die B is preferably held in place by a clamp, and the portion 23 of the surrounding wall of the bore $f$ forms the stationary member of the clamp. The said clamp comprises a movable clamp member 24, which (see Figs. 6, 7, and 15) embraces the die B opposite the stationary clamp member 23. The die B is rendered loose relative to or tightly clamped by and between the movable clamp member 24 and the stationary clamp member 23 (the surrounding wall of the bore $f$) by a proper manipulation of the screw 25, which extends into engagement with the outer end of the clamp member 24 through a correspondingly-screw-threaded hole 26, formed (see Fig. 6) in the outer end wall 27 of the slideway 28, which is formed in the plate F and engaged by the clamp member 24. The end wall 27 is a part of the stationary frame E. The clamp member 24 is obviously, therefore, adjustable toward and from the die B, which is removable endwise outwardly upon being adequately loosened.

A plate H is arranged on edge at the outer side and longitudinally of the plate F and is removably secured in place. The plate H abuts at its outer side, as shown very clearly in Fig. 15, against the inner side of a wall 29, with which the bed or frame E is provided. Screws $h$, which have their heads abutting against the outer side of the wall 29, extend through the said wall and through the plate H into the plate F, engaging correspondingly-screw-threaded holes 31, with which the plate F is provided. Obviously the plates F and H are rendered removable upon removing or withdrawing the screws $h$.

The rod or stock $g$ from which the blanks are cut (see Figs. 1, 4, 10, and 15) is fed to the machine at one side of the die B through the wall 29 and through the plates H and F, which are provided at one side of the die B with a tubular guide J, which is arranged horizontally and parallel with the said die and engages and extends through correspondingly-arranged registering holes 30 and 32, formed in the plates H and F, respectively. (See Figs. 4 and 15.) The die B preferably projects inwardly somewhat beyond the inner side of the plate F, and the guide J projects inwardly beyond the said side of the said plate as far as the die B. (See Figs. 1, 4, 8, and 15.) The stock $g$ is fed through the guide J to and against a laterally-projecting arm $k$ of an endwise-shiftable rod K, which is arranged horizontally at the inner side and longitudinally of and above the path of the slide C. (See Figs. 1, 2, 3, 4, 5, 8, and 9.) The rod K is arranged, therefore, at one side of and parallel with the path of the die A and at an elevation above the said path. The rod K has bearing in two boxes 33 and 34, which are arranged a suitable distance apart longitudinally of the said rod and are formed upon and preferably integral with a plate $l$, which is secured in any approved manner to a horizontal slide L, arranged (see Figs. 1, 2, 4, 5, and 15) to move at a right angle to the path of the die A. The slide L engages a correspondingly-arranged slideway 35, with which the bed or frame E is provided. The arm $k$ projects, therefore, laterally and inwardly from the rod K toward the path of the die A and forms a stop for the stock $g$ and serves as a gage for the length of the blanks to be cut from the stock. The stop or gage $k$ is adjustable endwise of the rod K, and consequently longitudinally of the path of the die A, and is secured in the desired adjustment by a suitably-applied set-screw 36.

The inner end of the guide J constitutes the stationary member of shears employed in cutting the blank from the stock $g$, and a jaw $m$, with which the slide L is provided, (see Figs. 1, 4, 5, 8, 9, and 15,) forms the movable member of the said shears. The outer side edge of the jaw or movable shear member m forms the cutting edge of the said member m. The inner extremity of the guide or stationary shear member J forms the cutting edge of the said member J. The path of the cutting edge of the jaw m is therefore next to the inner extremity or cutting edge of the guide J, between the latter and the gage or stop k. The jaw m is provided in its outer end (see Figs. 4 and 15) with a cavity or recess 37, which extends from side to side of the jaw and is arranged horizontally and parallel with the path of the stock g, which recess has the dimensions required to render the jaw m capable of embracing the adjacent side of the blank-forming portion of the stock g.

The slide L is operatively connected, by means of a link 38, (see Fig. 1,) with one arm 40 of a bell-crank Q, which is fulcrumed vertically, as at 42, to the bed or frame E. The bell-crank Q is operatively connected at the free end of its other arm 43, by means of a rod or pitman 44, with a slide 45, which is arranged parallel with the slide C and engages a correspondingly-arranged slideway 46, with which the bed or frame E is provided. Power is transmitted to the slide 45 from the shaft D. The slide 45 is shown provided at its outer end (see Figs. 1 and 14) with two parallel arms 47, arranged a suitable distance apart laterally of the slide to accommodate the location between them of two parallel rollers 48, which are arranged a suitable distance apart between and at a right angle to the said arms, and the shaft D is operatively provided with a cam 49, extending between the said rollers. It will be observed, therefore, that the combined movable shear member and blank-guiding jaw m is actuated inwardly or outwardly, according as the slide 45 is moved in the one direction or the other. The arms 47 are slotted, as at 50, to accommodate the extension of the shaft D therethrough without interfering with the movement of the slide 45.

It will be observed that during the inward actuation of the slide L the jaw m moves not only toward the stock g, but coöperates with the cutting edge of the guide J in cutting the blank-forming portion of the stock next to the said edge. The jaw m forms a lateral bearing for the blank during the cutting of the blank from the stock g, and the gage or stop k forms an end bearing for the blank during the cutting operation and during the feeding of the blank by the jaw m into position opposite the blank-receiving end of the bore b in the die B.

It will be observed that the gage or stop k coöperates with the blank-guiding jaw m in holding the blank during the blank-feeding operation parallel with the path of the die A. The jaw m and the gage or stop k participate, therefore, in centering the blank relative to the bore b in the die B; but the said jaw is arranged to operate at one side of the path of the movable die A, and in order to more positively center the blank with accuracy relative to the bore b another blank-centering jaw n is arranged to operate at the opposite side of the said path. (See Figs. 4, 5, 8, and 15.) The two blank-centering jaws m and n are arranged in the same plane horizontally, and the jaw n is provided in its face with a cavity or recess 52, which is arranged horizontally and extends from side to side of the said jaw and has the dimensions required to render the said jaw capable of embracing the adjacent side of the blank during the centering of the blank relative to the bore b in the die B.

The blank-centering jaw n is borne by a slide 53, which is arranged horizontally and parallel with the shaft D and engages (see Fig. 5) a correspondingly-arranged slideway 54, formed in the bed or frame E. The slide 53 is operatively connected at its outer end by a link 55 with the upper end of an upright lever 56, which is horizontally fulcrumed centrally and at a right angle to the path of the slide to a bracket or arm 57, projecting from and rigid with the frame E. The lever 56 terminates at its lower end (see Figs. 2, 3, and 5) in a fork 58, which straddles a sleeve 60, slidably mounted upon a rod 62, which is arranged horizontally and parallelly with and a suitable distance below the paths of the slides 53 and L, and the said rod is horizontally pivoted at its opposite end and at a right angle to the path of the slide L to an arm or bracket 63, depending from and rigid with the said slide L. The lever 56 is pivoted to the sleeve 60 horizontally and transversely of the sleeve, as at 59. A spiral spring 64 (see Figs. 2 and 5) is mounted and confined upon the rod 62 between the inner end of the sleeve 60 and an annular shoulder 65, which is formed upon and externally of the rod 62 and faces the inner end of the said sleeve. A nut 66 is mounted on the rod 62 at the outer end of the sleeve 60 and engages with corresponding screw-threads formed on the rod, and a washer 67 is interposed between the nut 66 and the sleeve 60. The spring acts to retain the sleeve 60 in its outer position. It will be observed, therefore, that the movement of the slide 53 is dependent upon the movement of the slide L; that the said slides, and consequently the two blank-centering jaws m and n, travel simultaneously toward each other or from each other, according as the slide L is actuated in the one or the other direction. It will be observed also that the spring 64 participates in the transmission of motion from the slide L to the jaw n and renders the jaws m and n capable of centering blanks varying in thickness and that obstructing matter finding access to and between the said jaws is not liable to result in the breakage of or injury to the mechanism connected with the jaw-bearing slides L and 53, because the spring 64 would compress, and thereby afford relief before damage was done. In other words, a yieldable or relief-affording operative connection between the jaw $n$ and the jaw $m$ is employed.

The slide 53 is provided at its outer end and a suitable distance from the outer end of the slideway 54 (see Figs. 1, 2, and 5) with an inwardly-facing shoulder 61, which is arranged to abut against the adjacent side of the bed or frame E in the inner position of the said slide and forms a stop to limit the inward actuation of the jaw $n$.

We would here remark that the arrangement of the parts is such that the jaws $m$ and $n$ upon the inward actuation of the said jaws are closed together or abut against each other, as shown in Figs. 8 and 10, without, however, gripping the blank, that the jaw $n$ shall have been actuated into its inner position somewhat before the jaw $m$ shall have moved into its inner position, so that the spring 64 shall be slightly compressed when the jaw $m$ shall have been actuated into its inner position, and that the tension of the said spring may be regulated by manipulating the nut 66.

A movable die A having a larger cavity $a$ or a movable die A having a smaller cavity $a$ than the die illustrated is employed if a larger or smaller head is to be formed upon the blank, and the adjustability of the gage-forming stop $k$ longitudinally of the path of the said die is important to accommodate more or less length in the blank, according as more or less metal is required to form the desired head. Of course the guide and shear member J are preferably readjusted inwardly or outwardly, according as a longer or shorter blank is desired, and obviously the combined movable shear member and blank-guiding and blank-centering jaw $m$ and the coöperating blank-centering jaw $n$ are preferably readjusted longitudinally of the path of the movable die A upon a readjustment of the combined stationary shear member and stock-guide J, which is secured in the desired adjustment by a suitably-applied set-screw J', which, as shown very clearly in Figs. 4 and 10, extends into engagement with the said shear member at the top of the latter through a correspondingly-screw-threaded hole formed in the plate F above the hole 32. Obviously, therefore, upon loosening the set-screw J' the member J is rendered free to be adjusted endwise and is secured in the desired adjustment upon tightening the said screw. The jaw $m$ in order to accommodate a readjustment of the same (see Figs. 4, 5, 9, and 15) is arranged within a recess 68, formed in a laterally and inwardly projecting lug 69 of an upright-plate 70, which is arranged horizontally and parallelly with the path of the movable die A and is adjustably secured to the slide L. The jaw $m$ is fixed to the lug 69 of the plate 70 by a suitably-applied set-screw I, which extends into engagement with the top of the said jaw through a correspondingly-screw-threaded hole formed in the top wall of the recess 68.

The jaw $m$ is adjustable longitudinally of the path of the rod or stock $g$, and to accommodate the said adjustment the plate 70, which carries the said jaw, as already indicated, is adjustably secured to the slide L, extending horizontally across the inner end of the said slide and being adjustable horizontally and at a right angle to the path of the said slide. The plate 70 is secured to the slide L in the desired adjustment by suitably-applied bolts R and nuts $r$. (See Figs. 5 and 15.) The bolts R are arranged parallel with the path of the slide L and a suitable distance apart transversely of the said path or longitudinally of the plate 70. The bolts R extend into a recess 76, which is formed in and extends horizontally across the inner end of the slide L. The bolts R are arranged with their heads engaging the vertically-enlarged portion 77 of the said recess. The shanks of the bolts R extend through the plate 70, and the correspondingly-screw-threaded nuts $r$ are mounted on the said shanks at the face of the said plate. The recess 76 has a vertically-enlarged slideway-forming portion 79, which is engaged by a tongue 71, formed upon the plate 70. The slideway-forming portion 79 of the recess 76 and the tongue 71 are arranged horizontally and are respectively uniform in dimensions vertically from end to end and long enough to accommodate the range of adjustment desired to be given to the plate 70. It will be observed, therefore, that the plate 70 is clamped to the slide L upon tightening the nuts $r$ and loosened relative to the said slide, and thereby rendered free to be readjusted upon loosening the said nuts. The jaw $m$ rests upon the bottom of the recess 68 and has bearing also against the inwardly and laterally facing side wall of the said recess.

The jaw $n$ is adjustable longitudinally of the path of the die A, and in order to accommodate the said adjustment a plate 80, which carries the said jaw, is adjustably secured to the slide 53, extending horizontally across the inner end of the said slide and being adjustable horizontally and at a right angle to the path of the said slide. The plate 80 is secured to the slide L in the desired adjustment by suitably-applied bolts T and nuts $t$. (See Figs. 4, 5, and 15.) The bolts T are arranged parallel with the path of the slide 53 and a suitable distance apart transversely of the said path and longitudinally of the plate 80. The bolts T extend into a recess 96, formed in and extending horizontally across the inner end of the slide 53. The bolts T are arranged with their heads engaging or movable into the vertically-enlarged portion 97 of the said recess. The shanks of the bolts T extend through the plate 80, and the correspondingly-screw-threaded nuts $t$ are mounted on the said shanks at the face of the said plate. The recess 96 has a vertically-enlarged slideway-forming portion 99, which is engaged by a tongue 81, formed upon the plate 80. The slideway-forming portion 99 of the recess 96 and the tongue 81 are arranged horizontally and are respectively uniform in dimensions vertically from end to end and long enough to accommodate the range of adjustment desired to be given to the plate 80. It will be observed, therefore, that the plate 80 is clamped to the slide 53 upon tightening the nuts $t$ and loosened relative to the said slide, and thereby rendered free to be readjusted upon loosening the said nuts.

The jaw $n$ rests upon the bottom of the recess 78, which is formed in a lug 75, with which the said plate is provided, and has bearing also against the inwardly and laterally facing side wall of the said recess. The jaw $n$ is secured in place by a suitably-applied set-screw N, which extends into engagement with the top of the said jaw through a correspondingly-screw-threaded hole formed in the top wall of the recess 78.

The gage or stop $k$ is employed also in feeding the blank endwise and into the bore $b$ of the die B when the latter is brought into position opposite the blank-receiving end of the said bore, as shown in Figs 8 and 9, wherein the blank is shown fed into line endwise with the said bore. In Fig. 11 the blank is shown introduced into the bore $b$ by the member $k$, and in Fig. 15 a rivet is shown formed.

The rod K is provided at its rear end (see Fig. 4) with a head 72, to which power is applied in actuating the said rod endwise and forwardly against the action of a spiral spring 73, mounted and confined on the said rod rearwardly of the box 34 between the said head and the adjacent and rear end of the said box. The spring 73 acts to retain the rod K, and consequently the blank-feeding device $k$ in their rear position, and the rod is provided at its forward end with a shoulder 74, arranged to abut against the forward end of the box 33 in the said position of the rod, and thereby limit the movement of the rod rearwardly.

The means employed for actuating the rod K comprises, (see Figs. 1, 4, and 13,) preferably, a plunger P, which is arranged horizontally and longitudinally of the path of the slide C between the rod K and the shaft D and is suitably supported from the stationary bed or frame E. The plunger P has a head 82, which has bearing in a correspondingly-arranged box 83, which is formed upon and integral with the bed or frame E and is chambered interiorly and longitudinally, as at 84. (See Fig. 13.) The chamber 13 extends from near the face of the plunger-head to the rear extremity of the said head. The plunger P has a stem 85, which extends into the rear end and longitudinally of the chamber 84. The stem 85 has bearing in a box 86, which is arranged in line with the box 83 and is formed upon and rigid with the bed or frame E. The stem 85 is provided a suitable distance rearwardly of the rear end of the box 86 with a horizontally-arranged roller 87, arranged to be engaged during the operation of the shaft D by a cam 88, which is formed upon the crank 20, as shown in Fig. 1. The stem 85 is provided between the boxes 83 and 86 and a suitable distance rearward of the inner end of the plunger-head 82, as shown in Fig. 13, with a diametrical enlargement 89, which is externally screw-threaded and engages corresponding screw-threads formed interiorly of an annular member 90 and in the rear position of the plunger abuts against the adjacent and forward end of the box 86 and in conjunction with the said box forms a stop to limit the rearward movement of the stem 85. The annular member 90 projects a suitable distance forwardly of the enlargement 89 of the stem 85 and is provided at its forward end and internally with an annular flange 91, which embraces the plunger-head 82 next forward of an annular flange 92, formed upon and externally of the rear end of the said head. A spiral spring $s$ is mounted and confined on the plunger-head 82 between the flange 91 and the rear end of the box 83. The spring $s$ acts to retain the plunger P in its rear position.

A spiral spring $u$ (see Fig. 13) is contained and confined within the chamber 84 of the plunger-head 82 next forward of the stem 85 and acts to retain the stem 85 in its rear position and yieldingly accommodates the rearward movement of the plunger-head 82 independently of the stem 85 by any undue resistance encountered by the said head during the operation of the plunger P.

By the construction hereinbefore described it will be observed that the cam 88 during the rotation of the shaft D comes into engagement with the roller 87 and thereupon actuates the plunger P forwardly against the action of the spring $s$ and results in the forward actuation of the blank-feeding device $k$, and the parts are so arranged and timed that when the combined gage and blank-feeding device $k$ is in position to feed the blank into the bore $b$ of the stationary die B, as shown in Figs. 8 and 9, the rod K, and consequently the said blank-feeding device $k$, shall be actuated against the action of the spring 73 forwardly as required to feed the blank endwise into the said bore, and we would here remark that the plunger-head 82 is enlarged laterally and inwardly, as at 93, (see Figs. 1 and 4,) to the required extent to render it capable of being in position to engage the rod K when the said rod, upon the inward actuation of the slide L, is in position to feed the blank into the bore $b$ of the die B.

In Fig. 11 a blank is shown introduced into the bore $b$ of the die B preparatory to the formation upon the projecting end of the said blank of a head 94 by the coöperation of the dies A and B, as shown in Fig. 15. Obviously during the heading operation the blank is forced to the inner extremity of the said bore $b$, and the free end of the shank of the rivet formed is beveled annularly by the shoulder 22. The formation of the bevel upon the free end of the shank of the rivet is important, because in cutting the blank from the rod or stock the metal is forced somewhat to one side, and in the absence of the said bevel the said shank during the riveting of the free end thereof is upset more at the said side. By the formation of the bevel upon the free end of the rivet, as hereinbefore described, accuracy and uniformity in the work during riveting is attained.

To prevent forcing of the blank beyond the inner extremity of the bore $b$ of the die B during the operation of the heading-dies, a movable stop $w$ is provided, which stop is formed (see Figs. 3, 4, 7, 8, 9, 11, and 15) by a vertically-movable block, which has its path arranged next the outer extremity of the said bore. The stop $w$ illustrated is capable of reciprocation vertically and engages a correspondingly-arranged guideway W, which is formed in the inner side of a stationary plate $x$, arranged at the back or outer side of the die-bearing plate F. The stop $w$ is arranged above or closes the bore $b$ in the die B at the outer end of the said bore, according as the said stop is in its upper and inoperative or in its lower and operative position.

It will be observed that the extension of the beveled shoulder 22 to the outer extremity of the bore $b$ in the stationary die B prevents the free end of the rivet-shank beveled by the said shoulder from being wedged too tightly into the cross-sectionally reduced end of the said bore, because the travel of the stop $w$ is arranged next to the outer end of the said shoulder and prevents forcing of the beveled portion of the rivet-shank beyond the outer end of the aforesaid shoulder.

Means for actuating the stop $w$ consists, preferably, of mechanism whose operation is controlled by the movement of the die-bearing slide C, and the parts are so arranged and timed that preparatory to the performance of the heading operation the stop $w$ shall be lowered into its bore-closing and operative position and shall be elevated after the heading operation to accommodate the operation of a pin or device employed in ejecting the rivet from the bore $b$ in the die B during the next succeeding rearward movement of the movable die A. The means shown for effecting the movement of the stop $w$ comprises an oscillating shaft $y$, arranged at the top of the bed or frame E at the outer side of the path of the slide C, which shaft is arranged horizontally and at a right angle to the shaft D. The oscillating shaft $y$ has bearing in boxes 21, with which the bed or frame E is provided, and extends over the plates F and H. The shaft $y$ is provided at its forward end and over the plate H (see Figs. 1, 2, 3, 4, and 12) with an inwardly and laterally projecting arm 100, which is operatively connected at its free end by links 102 with the stop $w$, as shown in Figs. 2, 4, and 12. The arm 100 is suitably fixed to the shaft $y$—as, for instance, by a pin $p$, as shown in Fig. 12. The shaft $y$ is provided at its rear end (see Figs. 1, 3, 12, 16, and 17) with an arm 103, which is arranged tangentially to the shaft and bears a roller 104, which engages with a guideway $v$, formed in the shaft-oscillating member V, with which the top of the slide C is provided. The arm 103 depends from the shaft $y$ and is pivoted at its inner end radially and transversely of the shaft $y$, as at 105, to a rearwardly-projecting lug or flange 106 of a collar 107, with which the shaft $y$ is provided. (See Figs. 12, 16, and 17.) The collar 107 is fixed to the shaft $y$ in any approved manner—as, for instance, by a pin $p'$, as shown in Figs. 1 and 12. The flange 106 is provided at its rear end with a forwardly-facing stop-forming shoulder 108, against which the arm 103 abuts when the arm is in its rearwardly-swung position. The arm 103 is, however, capable of being swung forwardly away from the shoulder or stop 108. The member V extends longitudinally of the slide C and is secured to the said slide in any approved manner. The guideway $v$ is formed by a slot or recess with which the member V is provided. The guideway $v$ extends longitudinally of the member V and declines at each end thereof, as shown in Fig. 12—that is, the guideway $v$ has its central portion 110 arranged horizontally. The guideway $v$ has two inclined portions 112 and 113 diverging downwardly—that is, the inclined portion 113 of the guideway $v$ slopes downwardly and rearwardly, whereas the inclined portion 112 of the said guideway slopes downwardly and forwardly. The guideway $v$ extends rearwardly of its rear inclined portion 113 and rearwardly of the latter is arranged horizontally, as at 114. The guideway $v$ extends forwardly of its forward inclined portion 112 and forwardly of the latter is arranged horizontally, as at 115. The arrangement of the parts is such that when the slide C is in its extreme forward position during the heading operation of the dies A and B, as shown in Figs. 1 and 3, the stop $w$ is in its lower and operative position, as shown very clearly in Figs. 2, 3, and 15, and the rear horizontal portion 114 of the guideway $v$ rearward of the rear inclined portion 114 of the guideway is engaged by the roller 104, as shown in Fig. 3; that during the rearward actuation of the said slide next after the heading operation the shaft $y$ upon the engagement with the roller 104 by the upwardly and forwardly extending lower wall or incline of the rear inclined portion 113 of the guideway $v$ because the shoulder or stop 108 prevents rearward swinging of the arm 103 is oscillated in the direction required to elevate the stop $w$ into its upper and inoperative position to accommodate the ejection from the bore $b$ of the die B of the rivet formed during the said heading operation; that the stop $w$ shall remain in its upper and inoperative position during the rearward movement of the slide C, while the roller 104 is engaged by the central horizontal portion 110 of the guideway $v$, as shown in Fig. 12; that upon the engagement with the said roller 104 during the rearward movement of the slide C by the forward inclined portion 112 of the guideway $b$ the downwardly and forwardly extending upper wall or incline of the said forwardly-inclined portion of the said guideway, because the shoulder or stop 108 prevents rearward swinging of the arm 103 shall oscillate the shaft $y$ in the direction required to lower the stop $w$ into its bore-closing and operative position to accommodate the feeding of the next succeeding blank toward and into the bore $b$ of the die B and that during the engagement of the forward horizontal portion 115 of the guideway $v$ by the roller 104 during the actuation of the slide C the said blank is introduced into the said bore $b$; that the stop $w$ will remain in its lower and inoperative position during the forward movement of the slide C, and that the engagement with the roller 104 by the inclined portions 112 and 113 of the guideway $v$ during the forward movement of the said slide shall not result in the operation of the shaft $y$, because the shaft-arm 103 is free to tilt forwardly without resulting in the oscillation of the said shaft. In dotted lines, Fig. 16, the arm 103 is shown in position with its roller 104 engaging the forward end of the guideway $v$.

It will be observed that the means provided for actuating the stop $u$ is exceedingly simple in construction, only requiring the employment of a single oscillating shaft $y$ and a few additional inexpensive members in transmitting motion from the slide C to the said stop.

Any approved means for ejecting the finished rivet from the die B may be employed. The rivet-ejecting means may, for instance, comprise an endwise-shiftable pin or rod 120, which (see Figs. 1, 2, 3, 12, and 15) is arranged horizontally and in line with the bore $b$ in the said die and small enough in cross-section to render it capable of entering the outer and smaller end of the said bore. The plate H is perforated or apertured, as at 122, to accommodate the location and operation of the rivet-ejecting device 120. Also the bed or frame E is bored or cut away, as at 121, to accommodate the location and operation of the blank-ejecting means. The rivet-ejecting device 120 is supported in any approved manner (see Figs. 1, 2, and 3) from an upwardly-projecting arm 123 of an endwise-shiftable rod 124, which is arranged horizontally and parallel with the member 120 at a suitable elevation below the said member 120. The rod 124 extends, therefore, forwardly and rearwardly of the machine. The rod is suitably supported from the bed or frame E, and a suitably-applied spring 125 (see Fig. 3) acts to retain the rod 124 in its forward position, in which the rivet-ejecting member 120 is forward of the path of the stop $w$, as shown in Figs. 7 and 15. The rod 124 is provided at its rear end with a roller 126, which is arranged parallel with the shaft D and in the path of a cam 127, formed upon the crank 18 of the said shaft, as shown in dotted lines, Fig. 3. The holding of the stationary die B firmly in place during the operation of the blank-ejecting means is obviously not unimportant, and it will be observed that with the said die gradually enlarged transversely toward its outer end and with the bore $f$ in the plate F correspondingly enlarged toward the said end, as hereinbefore described, the said die is positively prevented from displacement in the direction in which the rivet is ejected from the die by the rivet-ejecting means. The clamping means employed in securing the stationary die in place and preventing circumferential displacement of the die, as well as outwardly endwise displacement of the die, is not regarded as adequate for preventing inwardly endwise displacement of the die during the operation of the blank-ejecting means. The parts are so arranged and timed that upon the actuation of the stop $w$ into its upper and inoperative position during the rearward movement of the slide C upon the completion of the heading operation the cam 127 comes into engagement with the roller 126 and actuates the rod 124 rearwardly against the actuation of the spring 125 and results in the entrance of the pin or rod 120 into the bore $b$ of the die B, as shown in Fig. 12, and in the ejectment from the said bore of the rivet formed during the aforesaid heading operation.

It will be observed by the machine hereinbefore described that the rod or stock from which the blank is cut is fed into the machine against the gage $k$; that thereupon the movable shear-member-forming jaw $m$ is actuated to coöperate with the stationary shear member in cutting the said blank from the rod or stock; that the jaw $m$, in connection with the gage $k$, carries the blank to and in advance of and into line with the bore $b$ in the die B; that the blank-centering jaw $n$ moves inwardly with or during the inward movement of the jaw $m$; that the two jaws $m$ and $n$ accurately center the blank relative to the bore $b$ preparatory to the insertion of the blank by the gage $k$ into the said bore; that the movement of the blank endwise during its insertion into the said bore is limited by the beveled internal shoulder 22 of the said die, if the said die is provided with the said shoulder; that in any case endwise movement of the inserted blank during its insertion into the die B and during the heading operation is positively limited by the stop $w$, which is brought into its operative position preparatory to the heading operation; that the movable die A coöperates with the stationary die B in forming the desired head upon the blank; that the combined gage and blank-inserter $k$ is moved out of the way of the movable die immediately upon the insertion of the blank into the bore $b$ of the die B; that during the rearward movement of the movable die A the stop $w$ moves into its inoperative position to accommodate the operation of the blank-ejecting means, and that the said stop again moves into its operative position preparatory to the insertion of the next blank into the die B.

Our improved machine not only operates with great facility, but is simple and durable in construction, reliable in its operation, and not liable to get out of order.

We would here remark that the combined stop-guiding device and stationary shear member J and the blank-guiding and blank-centering jaws constitute means for accomplishing the interposition of the blank between the heading-dies and into line with the bore in the stationary die, and we would have it understood that our invention broadly embraces the combination with a movable heading-die and the stationary die arranged forwardly of the path of the movable die and provided with a blank-receiving bore arranged in line with the said path and any means whereby a blank is supplied to and between the said dies and into line with the aforesaid bore, of a blank-inserting member normally arranged at one side of the path of the movable die and movable into and from the said path, and means for actuating the said member longitudinally of the said path, all relatively arranged so that when a blank is interposed between the said dies in position to enter the bore in the stationary die the said blank-inserting member is actuated into position between the blank and the movable die and thereupon actuated longitudinally of the path of the movable die and toward the stationary die to effect the insertion of the blank into the bore of the stationary die, whereupon the said blank-inserting member is moved out of the said path preparatory to the heading operation of the dies.

As hereinbefore indicated, the combined stock-guiding device and shear member J, the combined blank-guiding jaw and shear member $m$, and the gage-forming stock $k$ are adjustable to accommodate longer or shorter blanks. For instance, to render the machine suitable for operating upon a longer blank a longer stationary die is used, which die obviously projects farther inwardly, and consequently the movable heading-die must either be replaced by another die whose face will be in the proper position relative to the stationary die or the movable die, if suitable for the longer stationary die and not requiring replacement, is backed up far enough to accommodate the use of the longer stationary die. The combined stock-guiding device and shear member J is of course readjusted inwardly a distance equal to the distance which the longer stationary die projects beyond the replaced stationary die, and the jaw $m$ is readjusted to bring its shear member into position to coöperate with the shear-forming end of the readjusted stock-guiding device, and the stop $k$ is also readjusted to accommodate the longer blank. The combined stock-guiding device and stationary shear member preferably projects inwardly slightly farther than the stationary die, so as to positively avoid interference with the guiding of the blank in advance of and into line with the stationary die.

What we claim is—

1. In a rivet-making machine, the combination, with two coöperating heading-dies, the one stationary and the other movable forwardly toward and rearwardly from the stationary die, with the stationary die provided with a blank-receiving bore arranged longitudinally of and extending from end to end of the stationary die, of a stop for closing the said bore at its outer end or removed from the bore according as the stop is in its operative or inoperative position; an oscillating shaft arranged longitudinally of the path of the movable die and provided with an arm operatively connected with the aforesaid stop and having another arm capable of being swung longitudinally of the shaft; means for limiting the rearward swinging of the last-mentioned arm, and a guideway-containing member connected and movable with the movable die and having its guideway engaged by the last-mentioned arm, and the arrangement of the parts and the trend of the said guideway being such that the stop is in its bore-closing and operative position during the heading operation and during the introduction of a blank into the aforesaid bore and shall be in its inoperative position subsequent to the heading operation to accommodate the ejection of the finished rivet from the bore.

2. In a rivet-making machine, the combination, with a slide; a slideway for the slide; means for actuating the slide; two coöperating heading-dies arranged in line endwise and parallel with the path of the slide, with one of the said dies borne by the slide and with the other die stationary and provided with a blank-receiving bore arranged longitudinally of and extending from end to end of the stationary die, of a vertically-movable stop closing the said bore at its outer end or removed from the bore according as the stop is in its operative or inoperative position; an oscillating shaft arranged at one side and extending longitudinally of the aforesaid path, which shaft is provided with an arm operatively connected with the aforesaid stop and has another arm free to swing forwardly; a stop for limiting the rearward swinging of the last-mentioned arm; a guideway-containing member borne by the aforesaid slide and having its guideway engaged by the last-mentioned arm, and the arrangement of the parts and the trend of the said guideway being such that the stop is in its bore-closing and operative position during the heading operation and during the introduction of a blank into the aforesaid bore and shall be in its inoperative position subsequent to the heading operation to accommodate the ejection of the finished rivet from the bore.

3. In a rivet-making machine, the combination, with a slide; a slideway for the slide; means for actuating the slide; two coöperating heading-dies arranged in line endwise and parallel with the path of the slide, with one of the said dies borne by the slide and with the other die stationary and provided centrally with a blank-receiving bore arranged longitudinally of and extending from end to end of the stationary die, of a vertically-movable stop closing the said bore at its outer end or arranged above the said bore according as the stop is in its lower and operative or upper and inoperative position; an oscillating shaft arranged at one side and extending longitudinally of the aforesaid path, which shaft is provided with an arm operatively connected with the aforesaid stop and has a roller-bearing arm arranged tangentially to the shaft and free to swing forwardly; means for limiting the swinging of the roller-bearing arm rearwardly; a guideway-containing member borne by the aforesaid slide and having its guideway engaged by the roller of the roller-bearing arm, and the arrangement of the parts and the trend of the said guideway being such that the stop is in its lower and bore-closing position during the heading operation and in its upper and inoperative position subsequent to the heading operation to accommodate the ejection of a finished rivet from the bore.

4. In a rivet-making machine, the combination, with a slide; a slideway for the slide; means for actuating the slide; two coöperating heading-dies arranged in line endwise, with one of the dies borne by the slide and with the other die stationary and provided with a blank-receiving bore arranged longitudinally of and extending from end to end of the stationary die, of a stop movable up and down and closing the said bore at its outer end or arranged above the bore according as the stop is in its lower and operative or upper and inoperative position; an oscillating shaft arranged at one side and extending longitudinally of the aforesaid path, which shaft is provided with an arm operatively connected with the aforesaid stop and has another depending arm arranged tangentially to the shaft and capable of being swung forwardly; a stop engaged by the said depending arm in the rearwardly-swung position of the arm; a guideway-containing member borne by the aforesaid slide and having its guideway engaged by the last-mentioned arm, which guideway has its central portion arranged horizontally and extending longitudinally of the slide and has two inclined portions diverging downwardly from opposite ends respectively of the central portion of the guideway, with the guideway extending outwardly from the lower ends of the inclined portions of the guideway, substantially as and for the purpose set forth.

5. In a rivet-making machine, the combination, with a forwardly and rearwardly movable slide; a slideway for the slide; means for actuating the slide; two coöperating heading-dies arranged in line endwise, with one of the dies borne by the slide and with the other die stationary and provided with a blank-receiving bore arranged longitudinally of and extending from end to end of the stationary die, of a movable stop which closes the said bore at its outer end or is removed from opposite the bore according as the stop is in its operative or inoperative position; an oscillating shaft arranged and extending longitudinally of the travel of the aforesaid slide and provided with an arm operatively connected with the aforesaid stop, which shaft has another arm capable of being swung; a collar on the shaft and provided with a member arranged to limit the swinging of the last-mentioned arm rearwardly, and a suitably-actuated guiding device operatively engaged by the last-mentioned arm, and the arrangement of the parts being such that the stop is in its bore-closing position during the heading operation and in its inoperative position subsequent to the heading operation to accommodate the ejection of the finished rivet from the bore.

6. In a rivet-making machine, the combination, with two coöperating heading-dies arranged in line endwise, the one stationary and the other movable toward and from the stationary die, with the stationary die provided with a blank-receiving bore arranged longitudinally of and extending from end to end of the die, of a movable stop closing the said bore at its outer end or removed from opposite the bore according as the stop is in its operative or inoperative position; an oscillating shaft arranged and extending longitudinally of the travel of the movable die and provided with an arm operatively connected with the aforesaid stop and having another arm capable of being swung forwardly; means arranged to limit the rearward swinging of the last-mentioned arm, and a suitably-actuated guideway-containing member having its guideway engaged by the last-mentioned arm, which guideway has its central portion arranged parallel or approximately parallel with the travel of the movable die and has two inclined portions diverging downwardly from opposite ends respectively of the central portion of the guideway, with the guideway extending outwardly from the lower ends of the inclined portions of the guideway, substantially as and for the purpose set forth.

7. In a rivet-making machine, the combination, with a stationary heading-die provided with a blank-receiving bore arranged longitudinally and extending from end to end of the die, a movable heading-die arranged to coöperate with the stationary die, and means for operating the movable die, of a movable stop closing the aforesaid bore at its outer end or removed from opposite the said bore according as the stop is in its operative or inoperative position; an oscillating shaft arranged at one side and extending longitudinally of the path of the movable die, which shaft is provided with an arm operatively connected with the aforesaid stop and has another arm arranged tangentially to the shaft and capable of being swung; a stop engaged by the last-mentioned arm in the rearwardly-swung position of the arm, a movable guiding device operatively engaged by the last-mentioned arm, and a connection between the said guiding device and the movable die, and the arrangement of the parts being such that the first-mentioned and movable stop is in its bore-closing position during the heading operation and in its inoperative position subsequent to the heading operation to accommodate the ejection of the finished rivet from the bore.

8. In a rivet-making machine, in combination, a slide; a slideway for the slide; means for actuating the slide; two coöperating heading-dies arranged in line endwise, with one of the dies borne by the slide and with the other die stationary and provided with a blank-receiving bore arranged longitudinally of and extending from end to end of the said stationary die, which bore is gradually reduced transversely and annularly between the ends of the bore from a point a suitable distance from the blank-receiving end of the bore to the opposite extremity of the bore, and a movable stop for closing the said bore at its last-mentioned end or removed from the bore according as the stop is in its operative or inoperative position.

9. In a rivet-making machine, a movable heading-die; means for operating the said die; a stationary die forward of the path of the movable die and arranged and adapted to coöperate with the movable die; means for preventing forcing of the stationary die out of place by the movable die during the operation of the dies; means for clamping the stationary die in place and comprising a stationary clamp member and a movable clamp member arranged at opposite sides respectively of the said die; means for guiding the movable clamp member, and means for causing the movable clamp member to clamp the stationary die against the stationary clamp member, and the stationary die and the bore formed between the clamp members and engaged by the said die being reduced transversely toward the path of the movable die.

10. In a rivet-making machine, a movable heading-die; means for actuating the said die; a stationary die forward of the path of the movable die and arranged and adapted to coöperate with the movable die and gradually decreased in dimensions transversely toward the aforesaid path, means for preventing backing of the stationary die by the movable die during the operation of the dies and a clamp comprising two coöperating clamp members arranged at opposite sides respectively of and gripping the die, with the opposing faces of the said clamp members sloping to conform to the external contour of the gripped die so that the bore formed between the said faces and engaged by the stationary die flares from the aforesaid path.

11. In a rivet-making machine, the combination, with a movable heading-die; means for operating the said die, and a stationary die forward of the path of the movable die and having a blank-receiving bore arranged in line with the said path, of two blank-centering jaws arranged at opposite sides respectively and adjustable longitudinally of the path of the movable die and movable toward and from each other with one of the said jaws provided with a cutting edge instrumental in cutting a blank from the stock; means for actuating the said jaws, and an endwise-adjustable stock-guiding member having a cutting edge arranged to coöperate with the aforesaid cutting edge of one of the blank-cutting jaws.

12. In a rivet-making machine, the combination, with a blank-guiding and blank-centering jaw, and means for actuating the said jaw, of another blank-centering jaw arranged opposite the first-mentioned jaw; a suitably-supported lever operatively connected with the second-mentioned jaw; a suitably-actuated endwise-shiftable rod; a connection between the rod and the first-mentioned jaw; a spiral spring confined on the rod; a sleeve slidably mounted on the rod at one end of the spring and movable endwise against the action of the spring, which sleeve is attached to the aforesaid lever, and a stop for limiting the movement of the sleeve in the opposite direction, and the arrangement of the parts being such that both jaws during their actuation move simultaneously toward or from each other.

13. In a rivet-making machine, the combination, with a blank-guiding and blank-centering jaw, and means for actuating the said jaw, of another blank-centering jaw arranged opposite the first-mentioned jaw; a suitably-supported lever operatively connected at one end with the said second-mentioned jaw; a rod operatively connected at one end with the said first-mentioned jaw and screw-threaded at its opposite end; a correspondingly-threaded nut engaging with screw-threads on the rod; a sleeve slidably mounted on the rod at the inner end of the nut and pivotally connected to the opposite end of the aforesaid lever; a spiral spring confined on the rod at the inner end of the sleeve, and a stop arranged to limit the inward movement of the second-mentioned jaw somewhat before the first-mentioned jaw has moved into its inner and blank-centering position, and the arrangement of the parts being such that both jaws during their actuation move simultaneously toward or from each other.

14. In a rivet-making machine, the combination, with a blank-guiding and blank-centering jaw; a slide bearing the said jaw; a slideway for the slide, and means for actuating the jaw-bearing slide, of another blank-centering jaw arranged opposite the first-mentioned jaw; a slide bearing the second-mentioned jaw and movable toward and from the first-mentioned slide; a slideway for the second-mentioned slide; a stop arranged to limit the inward movement of the last-mentioned slide; a suitably-supported lever operatively connected at one end with the second-mentioned slide; a rod operatively connected at one end with the first-mentioned slide and screw-threaded at its opposite end; a correspondingly-threaded nut engaging with screw-threads on the rod; a sleeve slidably mounted on the rod at the inner end of the nut and pivotally connected to the opposite end of the aforesaid lever, and a spiral spring confined on the rod at the inner end of the sleeve, all arranged and operating substantially as and for the purpose set forth.

15. In a rivet-making machine, the combination, with a movable heading-die; means for operating the said die, and a stationary die arranged to coöperate with the movable die and having a blank-receiving bore arranged to receive a blank interposed between the two dies, of a slide arranged at one side of and movable toward and from the path of the movable die; a plate borne by the slide and adjustable horizontally and transversely of the travel of the slide; a blank-guiding and blank-centering jaw borne by the said plate; means for actuating the slide; a slideway for the slide; an adjustable stock-guiding device arranged at the aforesaid side of the path of the movable die and having a cutting edge, and means for coöperating with the aforesaid jaw in centering the blank relative to the bore in the stationary die, and the said jaw having a cutting edge arranged to coöperate with the cutting edge of the stock-guiding device.

16. In a rivet-making machine, the combination, with a movable heading-die; means for operating the said die, and a stationary die arranged to coöperate with the movable die and having a blank-receiving bore arranged to receive a blank interposed between the dies, of two blank-centering jaws arranged at opposite sides respectively of the path of the movable die; two slides bearing the different jaws respectively and movable toward and from the said path; two plates adjustable horizontally and transversely of and borne by the different slides respectively; means for securing the plates in the desired adjustment; means for actuating the slides; slideways for the slides; a stop arranged at one side of the path of the movable die in position to be engaged by the blank-forming end of the rod or stock from which a blank is to be cut, and a stock-guiding device arranged opposite and adjustable toward and from the aforesaid stop and having a cutting edge, and one of the aforesaid jaws having a cutting edge arranged to coöperate with the cutting edge of the stock-guiding device during the actuation of the blank-centering jaws and thereby cut a blank from the stock.

17. In a rivet-making machine, the combination, with two coöperating heading-dies arranged in line endwise, with one of the dies movable and with the other die stationary and provided with a blank-receiving bore arranged in line with the path of the movable die, and means for actuating the movable die, of means adapted to insert a blank into the aforesaid bore and normally arranged at one side of the aforesaid path and movable into and out of the said path; means for moving the blank-inserting means to and from the said path, and means for operating the blank-inserting means to effect the insertion into the aforesaid bore of a blank interposed between the dies and in line with the said bore.

18. In a rivet-making machine, the combination, with a movable heading-die; means for actuating the said die, and a stationary die arranged forward of the path of the movable die and provided with a blank-receiving bore arranged in line with the said path, of a slide arranged at one side of and movable toward and from the aforesaid path; a slideway for the slide; a blank-inserting member borne by the slide and movable longitudinally of the aforesaid path independently of the slide and arranged to feed the blank into the aforesaid bore upon the inward movement of the slide, and means for actuating the blank-inserting member endwise.

19. In a rivet-making machine, the combination, with a movable heading-die; means for actuating the said die, and a stationary die arranged forward of the path of the movable die and provided with a blank-receiving bore arranged in line with the said path, of means for supplying a blank into place between the dies and into line with the said bore; a slide arranged at one side and movable toward and from the said path; a slideway for the slide; a blank-inserting member for inserting the blank interposed between the dies into the bore of the stationary die, which blank-inserting member is borne by the slide and movable longitudinally of the aforesaid path and arranged to feed the blank into the aforesaid bore upon the inward movement of the slide; a stop for limiting the rearward movement of the blank-inserting member; means acting to retain the blank-inserting member in its rear and normal position, and means for actuating the blank-inserting member forwardly.

20. In a rivet-making machine, the combination, with a movable heading-die; means for actuating the said die, and a stationary die arranged forward of the path of the movable die and provided with a blank-receiving bore arranged in line with the said path, of means for supplying a blank into place between the dies and into line with the said bore; a slide arranged at one side and movable toward and from the aforesaid path; a slideway for the slide; a blank-inserting member for inserting the blank interposed between the dies into the bore of the stationary die, which blank-inserting member is borne by the slide and movable longitudinally of the aforesaid path and arranged to feed the blank into the aforesaid bore upon the inward movement of the slide, and means for operating the blank-inserting member.

21. In a rivet-making machine, the combination, with a movable heading-die, means for actuating the said die, and a stationary die arranged to coöperate with the movable die and provided with a blank-receiving bore extending forwardly from the path of the movable die, of means for supplying a blank into place between the dies and into line with the said bore; a blank-inserting member movable toward and from the aforesaid path and arranged in its inner position for inserting the blank interposed between the dies into the bore of the stationary die; means for actuating the blank-inserting member toward and from the aforesaid path, and means for actuating the blank-inserting member longitudinally of the said path.

22. In a rivet-making machine, the combination, with a movable heading-die, means for actuating the said die, and a stationary die arranged forward of the path of the movable die and provided with a blank-receiving bore arranged in line with the said path, of means for supplying a blank into place between the dies and into line with the said bore; a slide arranged at one side and movable toward and from the aforesaid path; a slideway for the slide; an endwise-shiftable rod arranged at one side and longitudinally of the aforesaid path, which rod is supported from and movable longitudinally independently of the slide; a stop for limiting the rearward movement of the rod; means acting to retain the rod in its rear and normal position; a blank-inserting member for inserting the blank interposed between the dies into the bore of the stationary die, which blank-inserting member is borne by the rod and arranged to feed the blank into the aforesaid bore upon the inward movement of the slide, and means for actuating the rod forwardly.

23. In a rivet-making machine, the combination, with a movable heading-die, means for actuating the said die, and a stationary die arranged forward of the path of the movable die and provided with a blank-receiving bore arranged in line with the said path, of means for supplying a blank into place between the dies and into line with the said bore; a slide arranged at one side and movable toward and from the aforesaid path; a slideway for the slide; an endwise-shiftable rod arranged at one side of and longitudinally of the aforesaid path, which rod is supported from and movable longitudinally independently of the slide; a blank-inserting member secured to the rod and arranged to feed the blank into the aforesaid bore upon the inward movement of the slide, and means for actuating the rod forwardly.

24. In a rivet-making machine, the combination, with a movable heading-die, and a stationary die arranged forward of the path of the movable die and provided with a blank-receiving bore arranged in line with the said path, of means for supplying a blank into place between the dies and into line with the said bore; an endwise-shiftable rod movable toward and from and arranged longitudinally of the aforesaid path; means acting to retain the rod in its rear and normal position; a blank-inserting member for inserting the blank interposed between the dies into the bore of the stationary die, which blank-inserting member is borne by the rod; a yieldable plunger arranged longitudinally of the aforesaid path and in position to actuate the aforesaid rod forwardly; a bearing for the plunger; means acting to retain the plunger in its rear position; a stop for limiting the rearward movement of the plunger, and means for actuating the plunger forwardly.

25. In a rivet-making machine, the combination, with a movable heading-die and a stationary die arranged forward of the path of the movable die and provided with a blank-receiving bore arranged in line with the said path, of means for supplying a blank into place between the dies and into line with the said bore; an endwise-shiftable rod movable toward and from and arranged longitudinally of the aforesaid path; means for actuating the rod laterally; means acting to retain the rod in its rear and normal position; a blank-inserting member for inserting the blank interposed between the dies into the bore of the stationary die, which blank-inserting member is borne by the rod; a yieldable plunger arranged longitudinally of the aforesaid path and in position to actuate the aforesaid rod forwardly; a bearing for the plunger; means acting to retain the plunger in its rear position; a stop for limiting the rearward movement of the plunger, and means for actuating the plunger forwardly, and the plunger being enlarged laterally at its forward end.

Signed by us at Cleveland, Ohio, this 3d day of May, 1904.

WILLIAM S. BIDLE.
    JOSEPH A. COSTELLO.

Witnesses:
 CHAS. H. DORER,
 G. M. HAYES.